United States Patent
Liu et al.

(10) Patent No.: US 10,904,904 B2
(45) Date of Patent: Jan. 26, 2021

(54) METHODS AND DEVICES FOR CONTROLLING OVERRIDE OF CONFIGURED GRANT

(71) Applicant: Telefonaktiebolaget LM Ericsson (publ), Stockholm (SE)

(72) Inventors: Jinhua Liu, Beijing (CN); Min Wang, Luleå (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 16/318,452

(22) PCT Filed: Dec. 4, 2018

(86) PCT No.: PCT/CN2018/119161
§ 371 (c)(1),
(2) Date: Jan. 17, 2019

(87) PCT Pub. No.: WO2019/137116
PCT Pub. Date: Jul. 18, 2019

(65) Prior Publication Data
US 2020/0053749 A1    Feb. 13, 2020

(30) Foreign Application Priority Data
Jan. 11, 2018   (WO) ............... PCT/CN2018/072256

(51) Int. Cl.
*H04W 72/12*    (2009.01)
(52) U.S. Cl.
CPC ... *H04W 72/1257* (2013.01); *H04W 72/1289* (2013.01)

(58) Field of Classification Search
CPC ............ H04W 72/12; H04W 72/1205; H04W 72/1257; H04W 72/1278; H04W 72/1289; H04L 5/0053; H04L 5/0058
See application file for complete search history.

(56) References Cited

U.S. PATENT DOCUMENTS

| | | | |
|---|---|---|---|
| 2013/0343238 A1 | 12/2013 | Seo et al. | |
| 2018/0098349 A1* | 4/2018 | Sun | H04W 72/042 |

(Continued)

FOREIGN PATENT DOCUMENTS

| | | |
|---|---|---|
| WO | 2014066510 A1 | 5/2014 |
| WO | 2015116866 A1 | 8/2015 |

OTHER PUBLICATIONS

Vivo, "Collision between grant-based and grant-free resources on the same UL carrier", Oct. 9-13, 2017, 3GPP TSG-RAN WG2 Meeting #99bis, pp. 1-3 (Year: 2017).*

(Continued)

*Primary Examiner* — Paul H Masur
(74) *Attorney, Agent, or Firm* — Withrow & Terranova, PLLC

(57) ABSTRACT

The present disclosure provides a method in a terminal device for controlling override of a configured grant associated with a first radio resource. The method includes: receiving from a network device a dynamic grant associated with a second radio resource; and determining whether the dynamic grant is to override the configured grant based on whether the first radio resource and the second radio resource at least partially overlap in both time domain and frequency domain.

18 Claims, 8 Drawing Sheets

(56) References Cited

U.S. PATENT DOCUMENTS

| | | | | |
|---|---|---|---|---|
| 2019/0045507 A1* | 2/2019 | Sorrentino | ............ | H04W 76/14 |
| 2019/0075585 A1* | 3/2019 | Deogun | ................... | H04B 7/02 |
| 2019/0132862 A1* | 5/2019 | Jeon | ..................... | H04L 5/0087 |
| 2020/0059345 A1* | 2/2020 | Pelletier | .............. | H04W 74/006 |
| 2020/0196348 A1* | 6/2020 | Fan | ................... | H04W 72/1289 |

OTHER PUBLICATIONS

Author Unknown, "Technical Specification Group Radio Access Network; NR; Medium Access Control (MAC) protocol specification (Release 15)," Technical Specification 38.321, Version 15.0.0, 3GPP Organizational Partners, Dec. 2017, 55 pages.

Huawei, "R2-1713173: Summary of [99bis#41] [NR UP/MAC] Open issues on SPS and GF—Huawei," 3GPP TSG RAN WG2 Meeting 100, Nov. 27-Dec. 1, 2017, Reno, United States, 58 pages.

Interdigital Inc., "R2-1712786: Summary of [99b#40] [NR UP/MAC] LCP," 3GPP TSG-RAN WG2 #100, Nov. 27-Dec. 1, 2017, Reno, USA, 41 pages.

International Search Report and Written Opinion for International Patent Application No. PCT/CN2018/119161, dated Feb. 27, 2019, 9 pages.

Ericsson, "Tdoc R2-1712937: Remaining Issues for SPS in NR," 3GPP TSG-RAN WG2 #100, Nov. 27-Dec. 1, 2017, Reno, United States, 4 pages.

Extended European Search Report for European Patent Application No. 18822252.5, dated Mar. 25, 2020, 10 pages.

International Preliminary Report on Patentability for International Patent Application No. PCT/CN2018/119161, dated Apr. 26, 2020, 19 pages.

First Office Action for Chinese Patent Application No. 201880002886. X, dated Jun. 29, 2020, 15 pages.

* cited by examiner

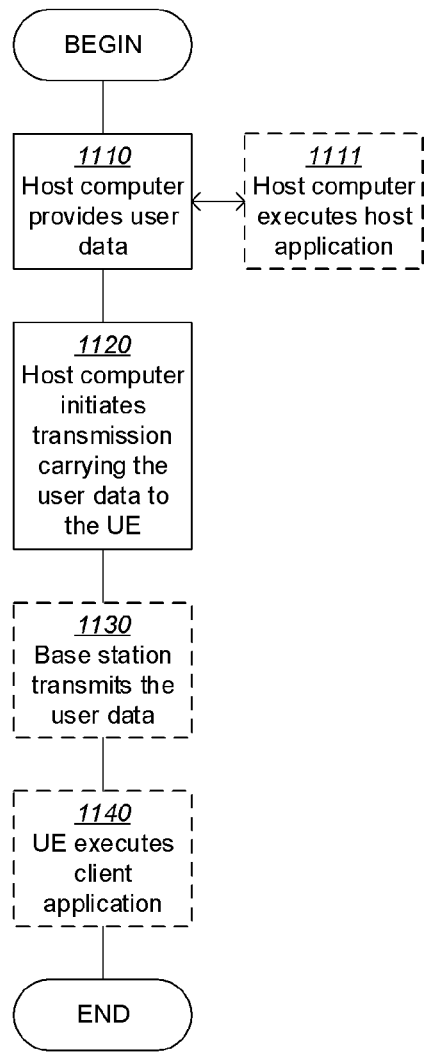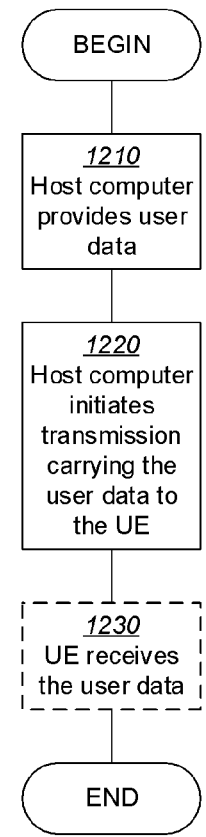
FIG. 11
FIG. 12

METHODS AND DEVICES FOR CONTROLLING OVERRIDE OF CONFIGURED GRANT

This application is a 35 U.S.C. § 371 national phase filing of International Application No. PCT/CN2018/119161, filed Dec. 4, 2018, which claims the benefit of International Application No. PCT/CN2018/072256, filed Jan. 11, 2018, the disclosures of which are incorporated herein by reference in their entireties.

TECHNICAL FIELD

The present disclosure relates to wireless communications, and more particularly, to methods and devices for controlling override of a configured grant.

BACKGROUND

Configured scheduling has been defined for New Radio (NR). In downlink, Semi-Persistent Scheduling (SPS) has been defined, as in Long Term Evolution (LTE). In uplink, there are two types of schemes for configuring a semi-static grant. For Type 1, an uplink grant can be configured via Radio Resource Control (RRC) signaling only, and the configured uplink grant can be activated upon reception of the RRC signaling. For Type 2, there are two phases. In the first phase, some parameters, which are less likely to be changed, such as start position, periodicity and Hybrid Automatic Repeat reQuest (HARQ) operations, can be configured via RRC signaling and in the second phase, Layer 1 (L1) parameters, such as time-frequency resources and Modulation and Coding Scheme (MCS), can be configured at Medium Access Control (MAC) layer.

It has been proposed that a dynamic grant, addressed to Cell—Radio Network Temporary Identity (C-RNTI), may override a configured grant, e.g., in the above SPS or Type 1 scenario.

However, there is a need for a solution for controlling such override, e.g., in what condition(s) shall such override be applied.

SUMMARY

It is an object of the present disclosure to provide methods and devices for controlling override of a configured grant, capable of controlling in what condition(s) such override shall be applied.

According to a first aspect of the present disclosure, a method in a terminal device for controlling override of a configured grant associated with a first radio resource is provided. The method includes: receiving from a network device a dynamic grant associated with a second radio resource; and determining whether the dynamic grant is to override the configured grant based on whether the first radio resource and the second radio resource at least partially overlap in both time domain and frequency domain.

In an embodiment, the operation of determining can include: determining that the dynamic grant is to override the configured grant when the first radio resource and the second radio resource at least partially overlap in both the time domain and the frequency domain; and determining that the dynamic grant is not to override the configured grant when the first radio resource and the second radio resource do not overlap in either the time domain or the frequency domain.

In an embodiment, the operation of determining whether the dynamic grant is to override the configured grant can be further based on a first transmission requirement associated with the configured grant and a second transmission requirement associated with the dynamic grant.

In an embodiment, the operation of determining whether the dynamic grant is to override the configured grant can include: determining that the dynamic grant is to override the configured grant when the first radio resource and the second radio resource at least partially overlap in both the time domain and the frequency domain and a first transmission requirement associated with the configured grant is lower than or equal to a second transmission requirement associated with the dynamic grant.

In an embodiment, the first transmission requirement being lower than or equal to the second transmission requirement can include one or more of: a received power density associated with the configured grant being lower than or equal to that associated with the dynamic grant; a Hybrid Automatic Repeat reQuest (HARQ) round trip time associated with the configured grant being longer than or equal to that associated with the dynamic grant; and a transmission duration associated with the configured grant being longer than or equal to that associated with the dynamic grant.

In an embodiment, the method can further include: receiving, from the network device, configuration information associated with the override of the configured grant. The operation of determining whether the dynamic grant is to override the configured grant can be responsive to the configuration information.

In an embodiment, the configuration information is applicable per configured scheduling configuration, per Medium Access Control (MAC) entity or per cell.

In an embodiment, the configuration information can be received via Radio Resource Control (RRC) signaling, a MAC Control Element (CE), or a Physical Downlink Control Channel (PDCCH) order.

In an embodiment, the configured grant and the dynamic grant can each be an uplink grant or a downlink assignment.

According to a second aspect of the present disclosure, a terminal device is provided. The terminal device includes a transceiver, a processor and a memory. The memory includes instructions executable by the processor whereby the terminal device is operative to perform the method according to the above first aspect.

According to a third aspect of the present disclosure, a computer readable storage medium is provided. The computer readable storage medium has computer program instructions stored thereon. The computer program instructions, when executed by a processor in a terminal device, cause the terminal device to perform the method according to the above first aspect.

According to a fourth aspect of the present disclosure, a method in a network device for controlling override of a configured grant associated with a first radio resource is provided. The method includes: transmitting to a terminal device a dynamic grant associated with a second radio resource; and determining whether the dynamic grant is to override the configured grant based on whether the first radio resource and the second radio resource at least partially overlap in both time domain and frequency domain.

In an embodiment, the operation of determining can include: determining that the dynamic grant is to override the configured grant when the first radio resource and the second radio resource at least partially overlap in both the time domain and the frequency domain; and determining that the dynamic grant is not to override the configured grant when the first radio resource and the second radio resource do not overlap in either the time domain or the frequency domain.

In an embodiment, the operation of determining whether the dynamic grant is to override the configured grant can be further based on a first transmission requirement associated with the configured grant and a second transmission requirement associated with the dynamic grant.

In an embodiment, the operation of determining whether the dynamic grant is to override the configured grant can include: determining that the dynamic grant is to override the configured grant when the first radio resource and the second radio resource at least partially overlap in both the time domain and the frequency domain and a first transmission requirement associated with the configured grant is lower than or equal to a second transmission requirement associated with the dynamic grant.

In an embodiment, the first transmission requirement being lower than or equal to the second transmission requirement include one or more of: a received power density associated with the configured grant being lower than or equal to that associated with the dynamic grant; a Hybrid Automatic Repeat reQuest (HARQ) round trip time associated with the configured grant being longer than or equal to that associated with the dynamic grant; and a transmission duration associated with the configured grant being longer than or equal to that associated with the dynamic grant.

In an embodiment, the method can further include: transmitting, to the terminal device, configuration information associated with the override of the configured grant.

In an embodiment, the configuration information can be applicable per configured scheduling, per Medium Access Control (MAC) entity or per cell.

In an embodiment, the configuration information is transmitted via Radio Resource Control (RRC) signaling, a MAC Control Element (CE), or a Physical Downlink Control Channel (PDCCH) order.

In an embodiment, the configured grant and the dynamic grant are each an uplink grant or a downlink assignment.

According to a fifth aspect of the present disclosure, a network device is provided. The network device includes a transceiver, a processor and a memory. The memory includes instructions executable by the processor whereby the network device is operative to perform the method according to the above fourth aspect.

According to a sixth aspect of the present disclosure, a computer readable storage medium is provided. The computer readable storage medium has computer program instructions stored thereon. The computer program instructions, when executed by a processor in a network device, cause the network device to perform the method according to the above fourth aspect.

With the above embodiments, a dynamic grant may override a configured grant when a radio resource associated with the dynamic grant and a radio resource associated with the configured grant at least partially overlap in both time domain and frequency domain, and possibly based further on other conditions. In this way, it is possible to control override of the configured grant in such a manner that degradation of Quality of Service (QoS) due to unnecessary override can be avoided.

BRIEF DESCRIPTION OF THE DRAWINGS

The above and other objects, features and advantages will be more apparent from the following description of embodiments with reference to the figures, in which:

FIGS. 11 to 14 are flowcharts illustrating methods implemented in a communication system including a host computer, a base station and a user equipment.

DETAILED DESCRIPTION

Figure 1:
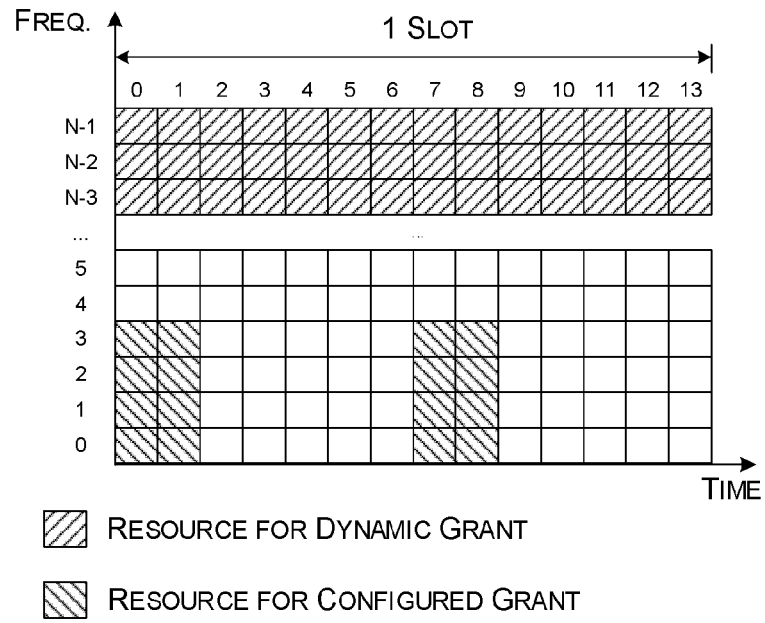
FIG. 1 is a schematic diagram showing radio resources associated with a configured grant and a dynamic grant overlapping in time domain.

As used herein, the term "wireless communication network" refers to a network following any suitable communication standards, such as LTE-Advanced (LTE-A), LTE, Wideband Code Division Multiple Access (WCDMA), High-Speed Packet Access (HSPA), and so on. Furthermore, the communications between a terminal device and a network device in the wireless communication network may be performed according to any suitable generation communication protocols, including, but not limited to, Global System for Mobile Communications (GSM), Universal Mobile Telecommunications System (UMTS), Long Term Evolution (LTE), and/or other suitable 1G (the first generation), 2G (the second generation), 2.5G, 2.75G, 3G (the third generation), 4G (the fourth generation), 4.5G, 5G (the fifth generation) communication protocols, wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards, and/or any other protocols either currently known or to be developed in the future.

The term "network device" refers to a device in a wireless communication network via which a terminal device accesses the network and receives services therefrom. The network device refers to a base station (BS), an access point (AP), or any other suitable device in the wireless communication network. The BS may be, for example, a node B (NodeB or NB), an evolved NodeB (eNodeB or eNB), or gNB, a Remote Radio Unit (RRU), a radio header (RH), a remote radio head (RRH), a relay, a low power node such as a femto, a pico, and so forth. Yet further examples of the network device may include multi-standard radio (MSR) radio equipment such as MSR BSs, network controllers such as radio network controllers (RNCs) or base station controllers (BSCs), base transceiver stations (BTSs), transmission points, transmission nodes. More generally, however, the network device may represent any suitable device (or group of devices) capable, configured, arranged, and/or operable to enable and/or provide a terminal device access to the wireless communication network or to provide some service to a terminal device that has accessed the wireless communication network.

The term "terminal device" refers to any end device that can access a wireless communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, portable computers, image capture terminal devices such as digital cameras, gaming terminal devices, music storage and playback appliances, a mobile phone, a cellular phone, a smart phone, voice over IP (VoIP) phones, wireless local loop phones, a tablet, a wearable device, a personal digital assistant (PDA), portable computers, desktop computer, image capture terminal devices such as digital cameras, gaming terminal devices, music storage and playback appliances, wearable terminal devices, vehicle-mounted wireless terminal devices, wireless endpoints, mobile stations, laptop-embedded equipment (LEE), laptop-mounted equipment (LME), USB dongles, smart devices, wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3rd Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

The terminal device may support device-to-device (D2D) communication, for example by implementing a 3GPP standard for sidelink communication, and may in this case be referred to as a D2D communication device.

As yet another example, in an Internet of Things (IOT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

As used herein, a downlink, DL transmission refers to a transmission from the network device to a terminal device, and an uplink, UL transmission refers to a transmission in an opposite direction.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms. The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

FIG. 1 is a schematic diagram showing radio resources associated with a configured grant and a dynamic grant overlapping in time domain. One slot, containing 14 Orthogonal Frequency Division Multiplexing (OFDM) symbols 0~13, is shown in the horizontal (time) axis, and N Physical Resource Block (PRB) groups indexed as 0~N−1 are shown in the vertical (frequency) axis. In the example shown in FIG. 1, the configured grant provides transmission opportunities each occupying 2 OFDM symbols (0~1; 7~8) and 4 PRB groups (0~4) at periodicity of 7 OFDM symbols, and the dynamic grant provides transmission opportunities across 14 OFDM symbols and 3 PRB groups (N−3~N−1). That is, the radio resource for the dynamic grant overlaps the radio resource for the configured grant in time domain. In this case, the dynamic grant may override the configured grant.

However, it has been realized that such override may result in performance degradation when the data mapped to the configured grant has a stricter (higher) QoS requirement, e.g., in terms of transmission delay and/or residual HARQ transmission error, than the data mapped to the dynamic grant. For example, when a terminal device having a configured grant (e.g., the configured grant in FIG. 1) for Ultra Reliable Low Latency Communication (URLLC) receives a dynamic grant (e.g., the dynamic grant in FIG. 1) for enhanced Mobile Broad Band (eMBB) data and decides that the dynamic grant is to override the configured grant, the URLLC data will be multiplexed with the eMBB data and transmitted in accordance with eMBB requirements on e.g., Block Error Rate (BLER) and delay. In this case, the QoS of the URLLC data may be significantly degraded.

Logical Channel Prioritization (LCP) may be taken into consideration to determine whether the dynamic grant shall override the configured grant when the radio resources scheduled by the two grants overlap in time domain. According to MAC specification 3GPP TS 38.321v15.0.0, the LCP procedure can be controlled by configuring the following mapping restrictions for each logical channel:

lcp-allowedSCS, which sets the allowed Subcarrier Spacing(s) for transmission;
lcp-maxPUSCH-Duration, which sets the maximum PUSCH duration allowed for transmission;
lcp-configuredGrantType1Allowed, which sets whether a Configured Grant Type 1 can be used for transmission; and
lcp-allowedServingCells, which sets the allowed cell(s) for transmission.

However, it has been realized that these restrictions only relate to transmission duration (i.e., only a part of the transmission delay) of each transmission attempt, but not to any of BLER, PDCCH miss rate, and actual HARQ transmission delay (such as Physical Downlink Control Channel (PDCCH) to Physical Downlink Shared Channel (PDSCH) delay, PDSCH to Downlink HARQ Acknowledgement (ACK) delay, and delay associated with scheduling of Physical Uplink Shared Channel (PUSCH) retransmission).

Figure 2:
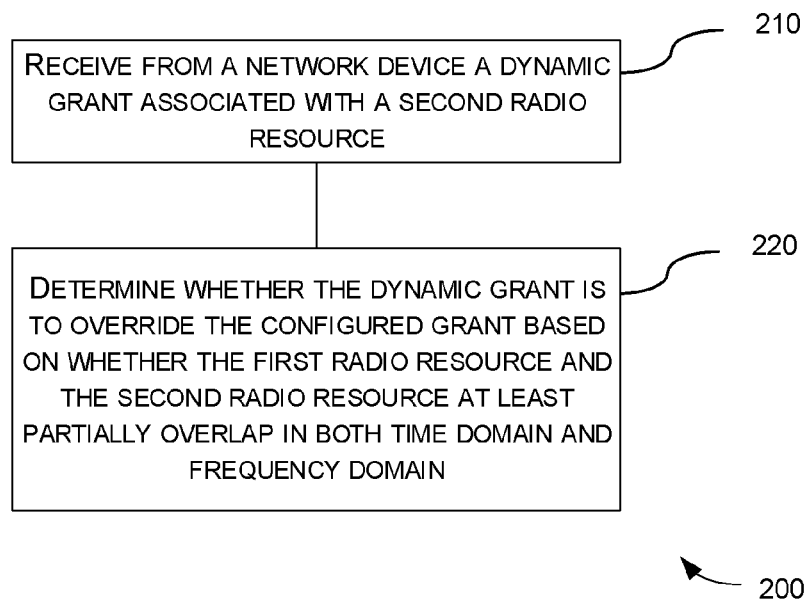
FIG. 2 is a flowchart illustrating a method in a terminal device for controlling override of a configured grant according to an embodiment of the present disclosure.

FIG. 2 is a flowchart illustrating a method 200 for controlling override of a configured grant according to an embodiment of the present disclosure. The method 200 can be performed at a terminal device. The configured grant is associated with a first radio resource. The configured grant can be intended for e.g., URLLC data. In the context of the present disclosure, a "configured grant" can be an uplink grant or a downlink assignment, unless indicated otherwise.

At block 210, a dynamic grant associated with a second radio resource is received from a network device. The dynamic grant can be intended for e.g., eMBB data. In the context of the present disclosure, a "dynamic grant" can be an uplink grant or a downlink assignment, unless indicated otherwise.

At block 220, it is determined whether the dynamic grant is to override the configured grant based on whether the first radio resource and the second radio resource at least partially overlap in both time domain and frequency domain.

In an example, in the block 220, it is determined that the dynamic grant is not to override the configured grant when the first radio resource and the second radio resource do not overlap in either the time domain or the frequency domain. That is, in the example shown in FIG. 1, the dynamic grant is not to override the configured grant since the radio resource associated with the dynamic grant and the radio resource associated with the configured grant overlap only in the time domain but not in the frequency domain. In this case, the terminal device can transmit Physical Uplink Shared Channel (PUSCH) (or receive Physical Downlink Shared Channel (PDSCH)) according to the configured grant, while transmitting PUSCH (or receiving PDSCH) according to the dynamic grant, with different transmission requirements (e.g., BLER, delay, etc.).

Figure 3:
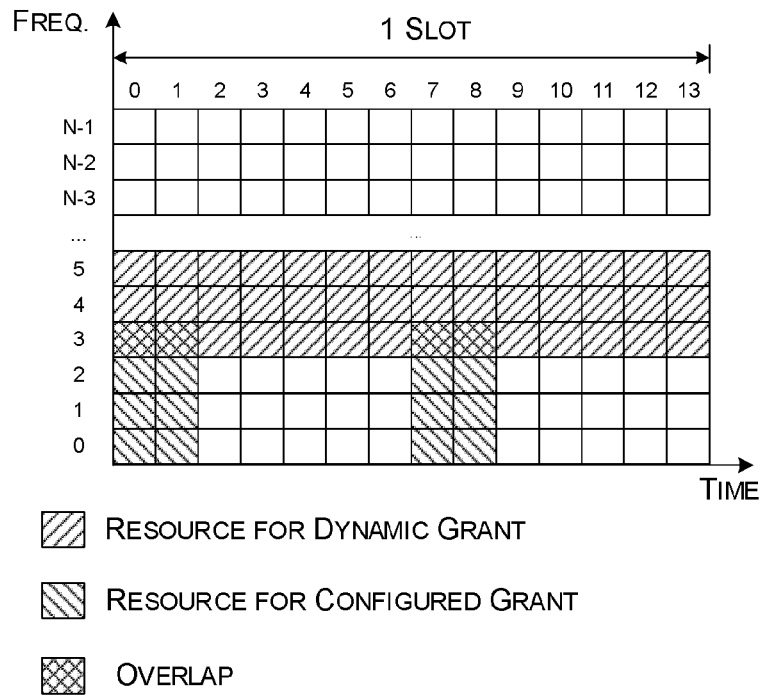
FIG. 3 is a schematic diagram showing radio resources associated with a configured grant and a dynamic grant overlapping in both time domain and frequency domain.

On the other hand, in the block 220, it is determined that the dynamic grant is to override the configured grant when the first radio resource and the second radio resource at least partially overlap in both the time domain and the frequency domain. FIG. 3 is a schematic diagram showing radio resources associated with a configured grant and a dynamic grant overlapping in both time domain and frequency domain. As shown, the radio resource associated with the dynamic grant and the radio resource associated with the configured grant overlap in both time domain and frequency domain at OFDM symbols 0~1, 7-8 and PRB group 3. In this case, the dynamic grant can override the configured grant and the terminal device can transmit PUSCH (or receive PDSCH) in accordance with the dynamic grant.

When the dynamic grant overrides the configured grant, the radio resource associated with the dynamic grant can be seized for transmission of high priority signals such as control messages, e.g., in case of network congestion.

In an example, the determination as to whether the dynamic grant is to override the configured grant in the block 220 can be further based on a first transmission requirement associated with the configured grant and a second transmission requirement associated with the dynamic grant. In this case, it can be determined that the dynamic grant is to override the configured grant when the first radio resource and the second radio resource at least partially overlap in both the time domain and the frequency domain and a first transmission requirement associated with the configured grant is lower than or equal to a second transmission requirement associated with the dynamic grant. Here, the first transmission requirement being lower than or equal to the second transmission requirement can include one or more of:

a received power density associated with the configured grant being lower than or equal to that associated with the dynamic grant (for uplink grant, the received power density is also known as P0_PUSCH);
a HARQ round trip time associated with the configured grant being longer than or equal to that associated with the dynamic grant; and
a transmission duration associated with the configured grant being longer than or equal to that associated with the dynamic grant (the transmission durations may be selected from 2, 7 and 14 OFDM symbols).

In other words, in the above example, even if the first radio resource and the second radio resource at least partially overlap in both the time domain and the frequency domain, the override can only be applied when the first transmission requirement is lower than or equal to (or similar as) the second transmission requirement. In this case, such override would not result in QoS degradation of the data that was initially mapped to the configured grant.

Alternatively, when the first radio resource and the second radio resource at least partially overlap only in the time domain, the override can be applied if the first transmission requirement is lower than or equal to the second transmission requirement.

In an example, the terminal device can receive, from the network device, configuration information associated with the override of the configured grant. The determination as to whether the dynamic grant is to override the configured grant in the block 220 can be responsive to the configuration information.

Here, the configuration information can indicate whether, and if so, in what condition, the override of the configured grant is to be applied. For example, the configuration information can indicate that the override of the configured grant is to be applied when the first radio resource and the second radio resource at least partially overlap in both time domain and frequency domain and/or when the first transmission requirement is lower than or equal to the second transmission requirement, as described above. Alternatively, the configuration information can indicate that the override of the configured grant can be applied when the first radio resource and the second radio resource at least partially overlap in time domain.

In an example, the configuration information is applicable per configured scheduling configuration, e.g., specific to one configured grant. Alternatively, the configuration information is applicable per MAC entity, e.g., to all configured grants associated with a MAC entity, or per cell, e.g., to all configured grants in a cell.

In an example, the configuration information can be received via Radio Resource Control (RRC) signaling, a MAC Control Element (CE), or a Physical Downlink Control Channel (PDCCH) order.

Figure 4:
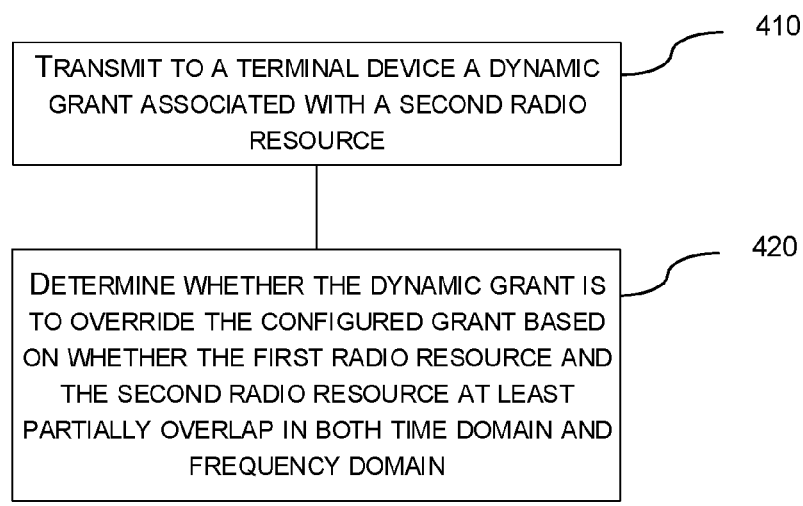
FIG. 4 is a flowchart illustrating a method in a network device for controlling override of a configured grant according to an embodiment of the present disclosure.

FIG. 4 is a flowchart illustrating a method 400 for controlling override of a configured grant according to an embodiment of the present disclosure. The method 400 can be performed at a network device. The configured grant is associated with a first radio resource. The configured grant can be intended for e.g., URLLC data.

At block 410, a dynamic grant associated with a second radio resource is transmitted to a terminal device. The dynamic grant can be intended for e.g., eMBB data.

Here, the configured grant and the dynamic grant can each be an uplink grant or a downlink assignment, unless indicated otherwise.

At block 420, it is determined whether the dynamic grant is to override the configured grant based on whether the first radio resource and the second radio resource at least partially overlap in both time domain and frequency domain.

In an example, in the block 420, it is determined that the dynamic grant is not to override the configured grant when the first radio resource and the second radio resource do not overlap in either the time domain or the frequency domain, e.g., in the example shown in FIG. 1. In this case, the network device can transmit PDSCH) (or receive PUSCH) according to the configured grant, while transmitting PDSCH (or receiving PUSCH) according to the dynamic grant, with different transmission requirements (e.g., BLER, delay, etc.).

On the other hand, in the block 420, it is determined that the dynamic grant is to override the configured grant when the first radio resource and the second radio resource at least partially overlap in both the time domain and the frequency domain, e.g., in the example shown in FIG. 3. In this case, the network device can transmit PDSCH (or receive PUSCH) in accordance with the dynamic grant.

When the dynamic grant overrides the configured grant, the radio resource associated with the dynamic grant can be seized for transmission of high priority signals such as control messages, e.g., in case of network congestion.

In an example, the determination as to whether the dynamic grant is to override the configured grant in the block 420 can be further based on a first transmission requirement associated with the configured grant and a second transmission requirement associated with the dynamic grant. In this case, it can be determined that the dynamic grant is to override the configured grant when the first radio resource and the second radio resource at least partially overlap in both the time domain and the frequency domain and a first transmission requirement associated with the configured grant is lower than or equal to (or similar as) a second transmission requirement associated with the dynamic grant. Here, the first transmission requirement being lower than or equal to the second transmission requirement can include one or more of:

a received power density associated with the configured grant being lower than or equal to that associated with the dynamic grant (for uplink grant, the received power density is also known as P0_PUSCH);

a HARQ round trip time associated with the configured grant being longer than or equal to that associated with the dynamic grant; and a transmission duration associated with the configured grant being longer than or equal to that associated with the dynamic grant (the transmission durations may be selected from 2, 7 and 14 OFDM symbols).

Alternatively, when the first radio resource and the second radio resource at least partially overlap only in the time domain, the override can be applied if the first transmission requirement is lower than or equal to the second transmission requirement.

In an example, the network device can transmit, to the terminal device, configuration information associated with the override of the configured grant. Here, the configuration information can indicate whether, and if so, in what condition, the override of the configured grant is to be applied, as described above.

In an embodiment, the configuration information is applicable per configured scheduling configuration, per MAC entity, or per cell.

In an embodiment, the configuration information can be transmitted via RRC signaling, a MAC CE, or a PDCCH order.

Figure 5:
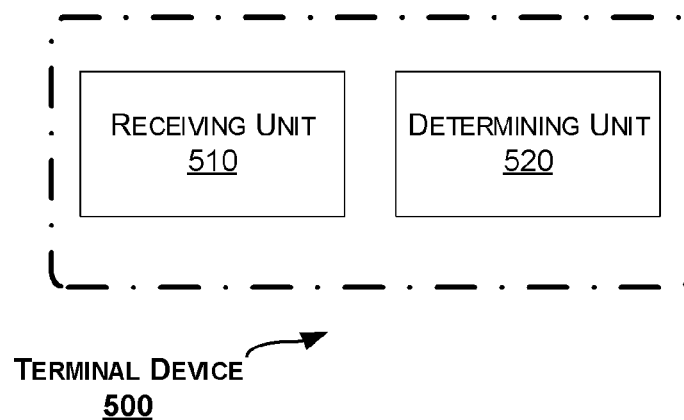
FIG. 5 is a block diagram of a terminal device according to an embodiment of the present disclosure.

Correspondingly to the method 200 as described above, a terminal device is provided. FIG. 5 is a block diagram of a terminal device 500 according to an embodiment of the present disclosure. The terminal device 500 can control override of a configured grant associated with a first radio resource.

As shown in FIG. 5, the terminal device 500 includes a receiving unit 510 configured to receive from a network device a dynamic grant associated with a second radio resource. The terminal device 500 further includes a determining unit 520 configured to determine whether the dynamic grant is to override the configured grant based on whether the first radio resource and the second radio resource at least partially overlap in both time domain and frequency domain.

In an embodiment, the determining unit 520 can be configured to determine that the dynamic grant is to override the configured grant when the first radio resource and the second radio resource at least partially overlap in both the time domain and the frequency domain; and determine that the dynamic grant is not to override the configured grant when the first radio resource and the second radio resource do not overlap in either the time domain or the frequency domain.

In an embodiment, the determining unit 520 can be configured to determine whether the dynamic grant is to override the configured grant further based on a first transmission requirement associated with the configured grant and a second transmission requirement associated with the dynamic grant.

In an embodiment, the determining unit 520 can be configured to determine that the dynamic grant is to override the configured grant when the first radio resource and the second radio resource at least partially overlap in both the time domain and the frequency domain and a first transmission requirement associated with the configured grant is lower than or equal to a second transmission requirement associated with the dynamic grant.

In an embodiment, the first transmission requirement being lower than or equal to the second transmission requirement can include one or more of: a received power density associated with the configured grant being lower than or equal to that associated with the dynamic grant; a Hybrid Automatic Repeat reQuest (HARQ) round trip time associated with the configured grant being longer than or equal to that associated with the dynamic grant; and a transmission duration associated with the configured grant being longer than or equal to that associated with the dynamic grant.

In an embodiment, the receiving unit 510 can be further configured to receive, from the network device, configuration information associated with the override of the configured grant. The determining unit 520 can make the determination as to whether the dynamic grant is to override the configured grant in response to the configuration information.

In an embodiment, the configuration information can be applicable per configured scheduling configuration, per Medium Access Control (MAC) entity or per cell.

In an embodiment, the configuration information can be received via Radio Resource Control (RRC) signaling, a MAC Control Element (CE), or a Physical Downlink Control Channel (PDCCH) order.

In an embodiment, the configured grant and the dynamic grant can each be an uplink grant or a downlink assignment.

The receiving unit 510 and the determining unit 520 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 2.

Figure 6:
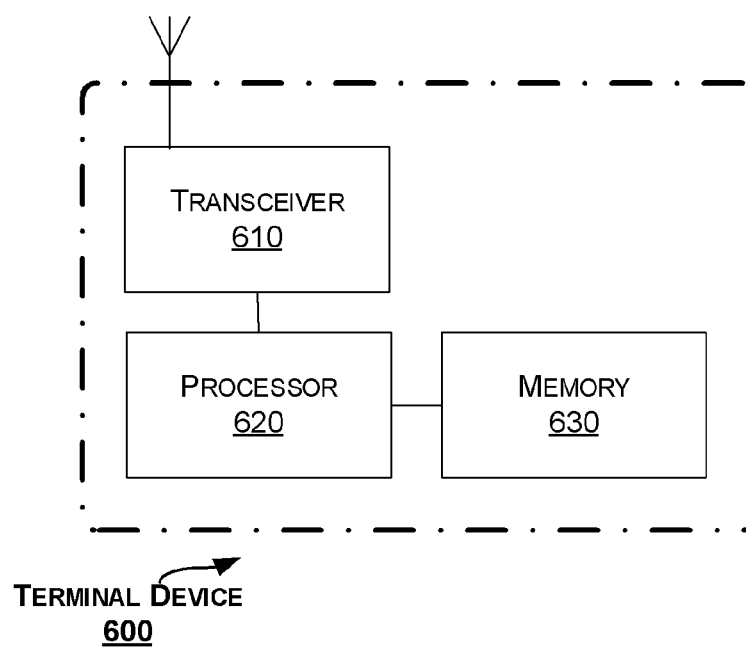
FIG. 6 is a block diagram of a terminal device according to another embodiment of the present disclosure.

FIG. 6 is a block diagram of a terminal device 600 according to another embodiment of the present disclosure. The terminal device 600 can control override of a configured grant associated with a first radio resource.

The terminal device 600 includes a transceiver 610, a processor 620 and a memory 630. The memory 630 contains instructions executable by the processor 620 whereby the terminal device 600 is operative to perform the actions, e.g., of the procedure described earlier in conjunction with FIG. 2. Particularly, the memory 630 contains instructions executable by the processor 620 whereby the terminal device 600 is operative to: determine that the dynamic grant is to override the configured grant when the first radio resource and the second radio resource at least partially overlap in both the time domain and the frequency domain; and determine that the dynamic grant is not to override the configured grant when the first radio resource and the second radio resource do not overlap in either the time domain or the frequency domain.

In an embodiment, the operation of determining whether the dynamic grant is to override the configured grant can be further based on a first transmission requirement associated with the configured grant and a second transmission requirement associated with the dynamic grant.

In an embodiment, the operation of determining whether the dynamic grant is to override the configured grant can include: determining that the dynamic grant is to override the configured grant when the first radio resource and the second radio resource at least partially overlap in both the time domain and the frequency domain and a first transmission requirement associated with the configured grant is lower than or equal to a second transmission requirement associated with the dynamic grant.

In an embodiment, the first transmission requirement being lower than or equal to the second transmission requirement can include one or more of: a received power density associated with the configured grant being lower than or equal to that associated with the dynamic grant; a Hybrid Automatic Repeat reQuest (HARQ) round trip time associated with the configured grant being longer than or equal to that associated with the dynamic grant; and a transmission duration associated with the configured grant being longer than or equal to that associated with the dynamic grant.

In an embodiment, the memory 630 can further contain instructions executable by the processor 620 whereby the terminal device 600 is operative to: receive, from the network device, configuration information associated with the override of the configured grant. The operation of determining whether the dynamic grant is to override the configured grant can be responsive to the configuration information.

In an embodiment, the configuration information is applicable per configured scheduling configuration, per Medium Access Control (MAC) entity or per cell.

In an embodiment, the configuration information can be received via Radio Resource Control (RRC) signaling, a MAC Control Element (CE), or a Physical Downlink Control Channel (PDCCH) order.

In an embodiment, the configured grant and the dynamic grant can each be an uplink grant or a downlink assignment.

Figure 7:
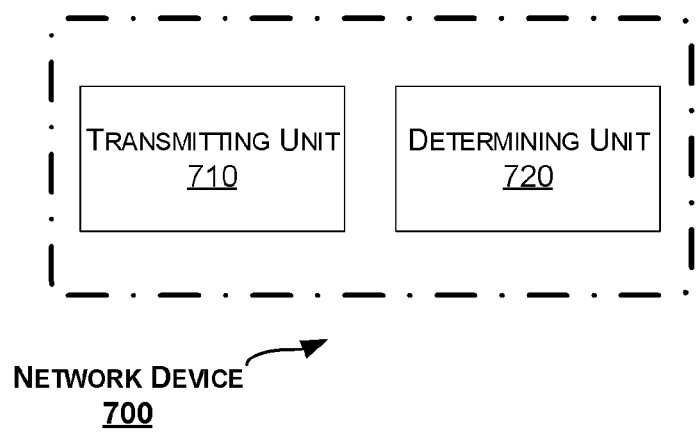
FIG. 7 is a block diagram of a network device according to an embodiment of the present disclosure.

Correspondingly to the method 400 as described above, a network device is provided. FIG. 7 is a block diagram of a network device 700 according to an embodiment of the present disclosure. The network device 700 can control override of a configured grant associated with a first radio resource.

As shown in FIG. 7, the network device 700 includes a transmitting unit 710 configured to transmit to a terminal device a dynamic grant associated with a second radio resource. The network device 700 further includes a determining unit 720 configured to determine whether the dynamic grant is to override the configured grant based on whether the first radio resource and the second radio resource at least partially overlap in both time domain and frequency domain.

In an embodiment, the determining unit 720 can be configured to: determine that the dynamic grant is to override the configured grant when the first radio resource and the second radio resource at least partially overlap in both the time domain and the frequency domain; and determine that the dynamic grant is not to override the configured grant when the first radio resource and the second radio resource do not overlap in either the time domain or the frequency domain.

In an embodiment, the determining unit 720 can be configured to determine whether the dynamic grant is to override the configured grant further based on a first transmission requirement associated with the configured grant and a second transmission requirement associated with the dynamic grant.

In an embodiment, the determining unit 720 can be configured to determine that the dynamic grant is to override the configured grant when the first radio resource and the second radio resource at least partially overlap in both the time domain and the frequency domain and a first transmission requirement associated with the configured grant is lower than or equal to a second transmission requirement associated with the dynamic grant.

In an embodiment, the first transmission requirement being lower than or equal to the second transmission requirement include one or more of: a received power density associated with the configured grant being lower than or equal to that associated with the dynamic grant; a Hybrid Automatic Repeat reQuest (HARQ) round trip time associated with the configured grant being longer than or equal to that associated with the dynamic grant; and a transmission duration associated with the configured grant being longer than or equal to that associated with the dynamic grant.

In an embodiment, the transmitting unit 710 can be further configured to transmit, to the terminal device, configuration information associated with the override of the configured grant.

In an embodiment, the configuration information can be applicable per configured scheduling, per Medium Access Control (MAC) entity or per cell.

In an embodiment, the configuration information is transmitted via Radio Resource Control (RRC) signaling, a MAC Control Element (CE), or a Physical Downlink Control Channel (PDCCH) order.

In an embodiment, the configured grant and the dynamic grant are each an uplink grant or a downlink assignment.

The transmitting unit 710 and the determining unit 720 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 4.

Figure 8:
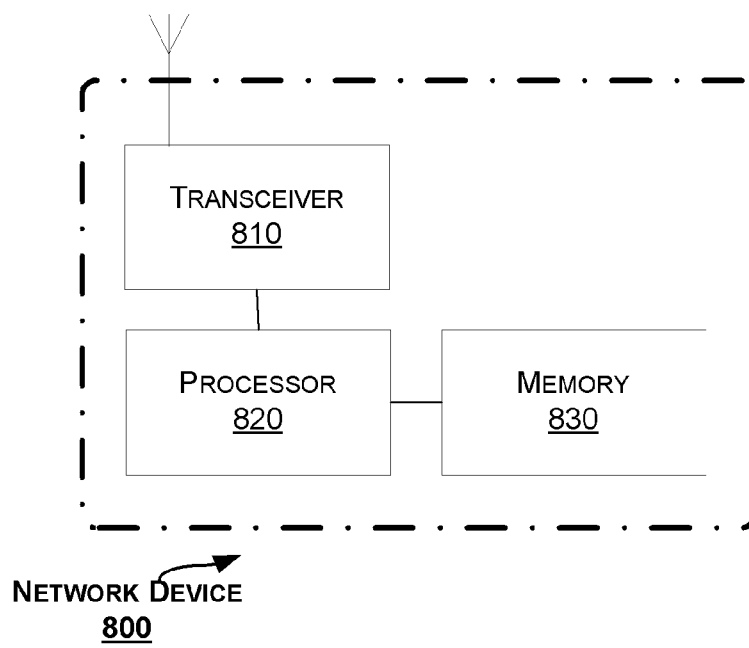
FIG. 8 is a block diagram of a network device according to another embodiment of the present disclosure.

FIG. 8 is a block diagram of a network device 800 according to another embodiment of the present disclosure. The network device 800 can control override of a configured grant associated with a first radio resource.

The network device 800 includes a transceiver 810, a processor 820 and a memory 830. The memory 830 contains instructions executable by the processor 820 whereby the network device 800 is operative to perform the actions, e.g., of the procedure described earlier in conjunction with FIG. 4. Particularly, the memory 830 contains instructions executable by the processor 820 whereby the network device 800 is operative to: transmit to a terminal device a dynamic grant associated with a second radio resource; and determine whether the dynamic grant is to override the configured grant based on whether the first radio resource and the second radio resource at least partially overlap in both time domain and frequency domain.

In an embodiment, the operation of determining can include: determining that the dynamic grant is to override the configured grant when the first radio resource and the second radio resource at least partially overlap in both the time domain and the frequency domain; and determining that the dynamic grant is not to override the configured grant when the first radio resource and the second radio resource do not overlap in either the time domain or the frequency domain.

In an embodiment, the operation of determining whether the dynamic grant is to override the configured grant can be further based on a first transmission requirement associated with the configured grant and a second transmission requirement associated with the dynamic grant.

In an embodiment, the operation of determining whether the dynamic grant is to override the configured grant can include: determining that the dynamic grant is to override the configured grant when the first radio resource and the second radio resource at least partially overlap in both the time domain and the frequency domain and a first transmission requirement associated with the configured grant is lower than or equal to a second transmission requirement associated with the dynamic grant.

In an embodiment, the first transmission requirement being lower than or equal to the second transmission requirement include one or more of: a received power density associated with the configured grant being lower than or equal to that associated with the dynamic grant; a Hybrid Automatic Repeat reQuest (HARQ) round trip time associated with the configured grant being longer than or equal to that associated with the dynamic grant; and a transmission duration associated with the configured grant being longer than or equal to that associated with the dynamic grant.

In an embodiment, the memory 830 can further contain instructions executable by the processor 820 whereby the network device 800 is operative to: transmit, to the terminal device, configuration information associated with the override of the configured grant.

In an embodiment, the configuration information can be applicable per configured scheduling, per Medium Access Control (MAC) entity or per cell.

In an embodiment, the configuration information is transmitted via Radio Resource Control (RRC) signaling, a MAC Control Element (CE), or a Physical Downlink Control Channel (PDCCH) order.

In an embodiment, the configured grant and the dynamic grant are each an uplink grant or a downlink assignment.

The present disclosure also provides at least one computer program product in the form of a non-volatile or volatile memory, e.g., a non-transitory computer readable storage medium, an Electrically Erasable Programmable Read-Only Memory (EEPROM), a flash memory and a hard drive. The computer program product includes a computer program. The computer program includes:

code/computer readable instructions, which when executed by the processor 620 causes the terminal device 600 to perform the actions, e.g., of the procedure described earlier in conjunction with FIG. 2; or code/computer readable instructions, which when executed by the processor 820 causes the network device 800 to perform the actions, e.g., of the procedure described earlier in conjunction with FIG. 4.

The computer program product may be configured as a computer program code structured in computer program modules. The computer program modules could essentially perform the actions of the flow illustrated in FIG. 2 or 4.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a non-transitory computer readable storage medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories.

Figure 9:
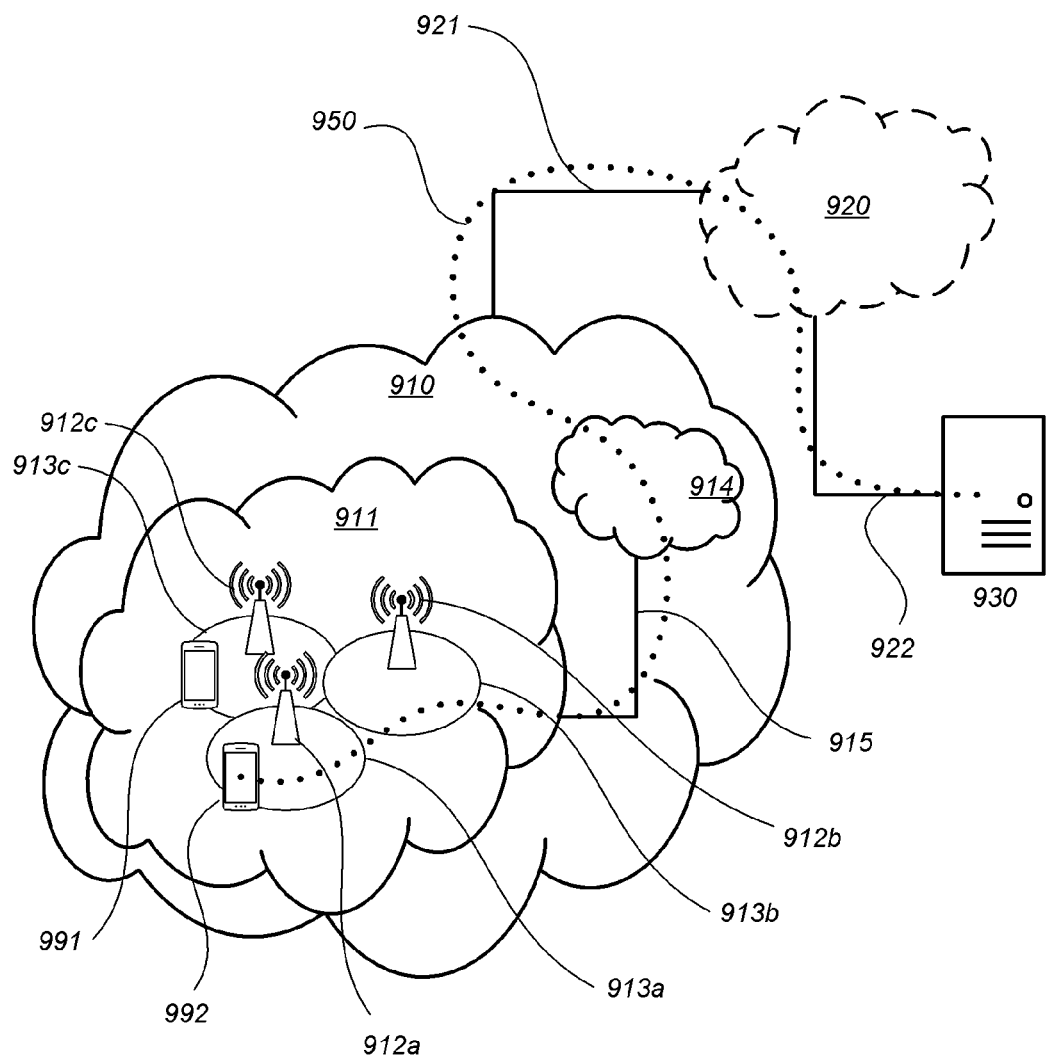
FIG. 9 schematically illustrates a telecommunication network connected via an intermediate network to a host computer.

With reference to FIG. 9, in accordance with an embodiment, a communication system includes a telecommunication network 910, such as a 3GPP-type cellular network, which comprises an access network 911, such as a radio access network, and a core network 914. The access network 911 comprises a plurality of base stations 912a, 912b, 912c, such as NBs, eNBs, gNBs or other types of wireless access points, each defining a corresponding coverage area 913a, 913b, 913c. Each base station 912a, 912b, 912c is connectable to the core network 914 over a wired or wireless connection 915. A first user equipment (UE) 991 located in coverage area 913c is configured to wirelessly connect to, or be paged by, the corresponding base station 912c. A second UE 992 in coverage area 913a is wirelessly connectable to the corresponding base station 912a. While a plurality of UEs 991, 992 are illustrated in this example, the disclosed embodiments are equally applicable to a situation where a sole UE is in the coverage area or where a sole UE is connecting to the corresponding base station 912.

The telecommunication network 910 is itself connected to a host computer 930, which may be embodied in the hardware and/or software of a standalone server, a cloud-implemented server, a distributed server or as processing resources in a server farm. The host computer 930 may be under the ownership or control of a service provider, or may be operated by the service provider or on behalf of the service provider. The connections 921, 922 between the telecommunication network 910 and the host computer 930 may extend directly from the core network 914 to the host computer 930 or may go via an optional intermediate network 920. The intermediate network 920 may be one of, or a combination of more than one of, a public, private or hosted network; the intermediate network 920, if any, may be a backbone network or the Internet; in particular, the intermediate network 920 may comprise two or more sub-networks (not shown).

The communication system of FIG. 9 as a whole enables connectivity between one of the connected UEs 991, 992 and the host computer 930. The connectivity may be described as an over-the-top (OTT) connection 950. The host computer 930 and the connected UEs 991, 992 are configured to communicate data and/or signaling via the OTT connection 950, using the access network 911, the core network 914, any intermediate network 920 and possible further infrastructure (not shown) as intermediaries. The OTT connection 950 may be transparent in the sense that the participating communication devices through which the OTT connection 950 passes are unaware of routing of uplink and downlink communications. For example, a base station 912 may not or need not be informed about the past routing of an incoming downlink communication with data originating from a host computer 930 to be forwarded (e.g., handed over) to a connected UE 991. Similarly, the base station 912 need not be aware of the future routing of an outgoing uplink communication originating from the UE 991 towards the host computer 930.

Example implementations, in accordance with an embodiment, of the UE, base station and host computer discussed in the preceding paragraphs will now be described with reference to FIG. 10. In a communication system 1000, a host computer 1010 comprises hardware 1015 including a communication interface 1016 configured to set up and maintain a wired or wireless connection with an interface of a different communication device of the communication system 1000. The host computer 1010 further comprises processing circuitry 1018, which may have storage and/or processing capabilities. In particular, the processing circuitry 1018 may comprise one or more programmable processors, application-specific integrated circuits, field programmable gate arrays or combinations of these (not shown) adapted to execute instructions. The host computer 1010 further comprises software 1011, which is stored in or accessible by the host computer 1010 and executable by the processing circuitry 1018. The software 1011 includes a host application 1012. The host application 1012 may be operable to provide a service to a remote user, such as a UE 1030 connecting via an OTT connection 1050 terminating at the UE 1030 and the host computer 1010. In providing the service to the remote user, the host application 1012 may provide user data which is transmitted using the OTT connection 1050.

The communication system 1000 further includes a base station 1020 provided in a telecommunication system and comprising hardware 1025 enabling it to communicate with the host computer 1010 and with the UE 1030. The hardware 1025 may include a communication interface 1026 for setting up and maintaining a wired or wireless connection with an interface of a different communication device of the communication system 1000, as well as a radio interface 1027 for setting up and maintaining at least a wireless connection 1070 with a UE 1030 located in a coverage area (not shown in FIG. 10) served by the base station 1020. The communication interface 1026 may be configured to facilitate a connection 1060 to the host computer 1010. The connection 1060 may be direct or it may pass through a core network (not shown in FIG. 10) of the telecommunication system and/or through one or more intermediate networks outside the telecommunication system. In the embodiment shown, the hardware 1025 of the base station 1020 further includes processing circuitry 1028, which may comprise one or more programmable processors, application-specific integrated circuits, field programmable gate arrays or combinations of these (not shown) adapted to execute instructions. The base station 1020 further has software 1021 stored internally or accessible via an external connection.

The communication system 1000 further includes the UE 1030 already referred to. Its hardware 1035 may include a radio interface 1037 configured to set up and maintain a wireless connection 1070 with a base station serving a coverage area in which the UE 1030 is currently located. The hardware 1035 of the UE 1030 further includes processing circuitry 1038, which may comprise one or more programmable processors, application-specific integrated circuits, field programmable gate arrays or combinations of these (not shown) adapted to execute instructions. The UE 1030 further comprises software 1031, which is stored in or accessible by the UE 1030 and executable by the processing circuitry 1038. The software 1031 includes a client application 1032. The client application 1032 may be operable to provide a service to a human or non-human user via the UE 1030, with the support of the host computer 1010. In the host computer 1010, an executing host application 1012 may communicate with the executing client application 1032 via the OTT connection 1050 terminating at the UE 1030 and the host computer 1010. In providing the service to the user, the client application 1032 may receive request data from the host application 1012 and provide user data in response to the request data. The OTT connection 1050 may transfer both the request data and the user data. The client application 1032 may interact with the user to generate the user data that it provides.

Figure 10:
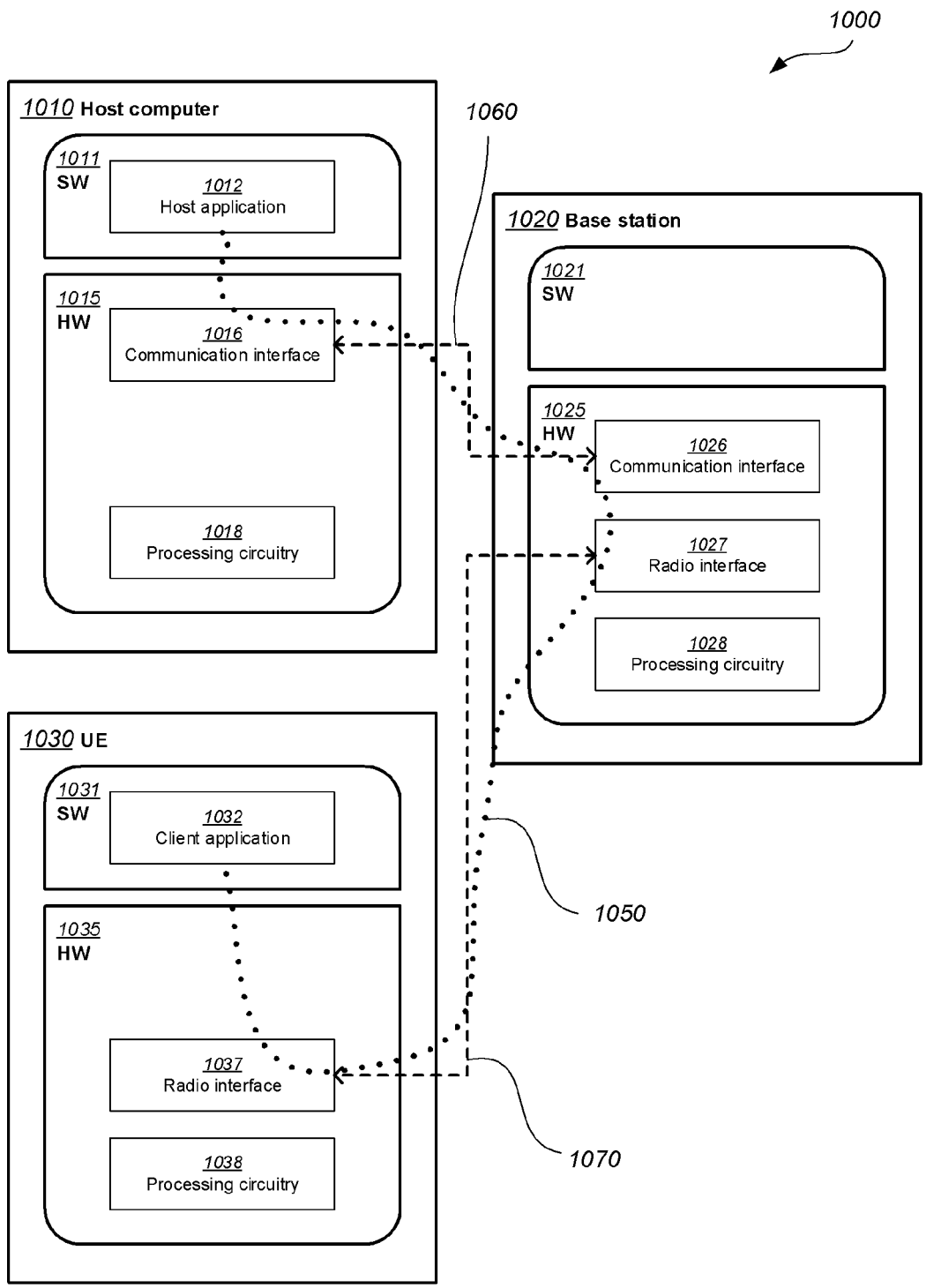
FIG. 10 is a generalized block diagram of a host computer communicating via a base station with a user equipment over a partially wireless connection.

It is noted that the host computer 1010, base station 1020 and UE 1030 illustrated in FIG. 10 may be identical to the host computer 930, one of the base stations 912*a*, 912*b*, 912*c* and one of the UEs 991, 992 of FIG. 9, respectively. This is to say, the inner workings of these entities may be as shown in FIG. 10 and independently, the surrounding network topology may be that of FIG. 9.

In FIG. 10, the OTT connection 1050 has been drawn abstractly to illustrate the communication between the host computer 1010 and the use equipment 1030 via the base station 1020, without explicit reference to any intermediary devices and the precise routing of messages via these devices. Network infrastructure may determine the routing, which it may be configured to hide from the UE 1030 or from the service provider operating the host computer 1010, or both. While the OTT connection 1050 is active, the network infrastructure may further take decisions by which it dynamically changes the routing (e.g., on the basis of load balancing consideration or reconfiguration of the network).

The wireless connection 1070 between the UE 1030 and the base station 1020 is in accordance with the teachings of the embodiments described throughout this disclosure. One or more of the various embodiments improve the performance of OTT services provided to the UE 1030 using the OTT connection 1050, in which the wireless connection 1070 forms the last segment. More precisely, the teachings of these embodiments may improve the reliability and latency of higher priority traffic and thereby provide benefits such as reduced user waiting time.

A measurement procedure may be provided for the purpose of monitoring data rate, latency and other factors on which the one or more embodiments improve. There may further be an optional network functionality for reconfiguring the OTT connection 1050 between the host computer 1010 and UE 1030, in response to variations in the measurement results. The measurement procedure and/or the network functionality for reconfiguring the OTT connection 1050 may be implemented in the software 1011 of the host computer 1010 or in the software 1031 of the UE 1030, or both. In embodiments, sensors (not shown) may be deployed in or in association with communication devices through which the OTT connection 1050 passes; the sensors may participate in the measurement procedure by supplying values of the monitored quantities exemplified above, or supplying values of other physical quantities from which software 1011, 1031 may compute or estimate the monitored quantities. The reconfiguring of the OTT connection 1050 may include message format, retransmission settings, preferred routing etc.; the reconfiguring need not affect the base station 1020, and it may be unknown or imperceptible to the base station 1020. Such procedures and functionalities may be known and practiced in the art. In certain embodiments, measurements may involve proprietary UE signaling facilitating the host computer's 1010 measurements of throughput, propagation times, latency and the like. The measurements may be implemented in that the software 1011, 1031 causes messages to be transmitted, in particular empty or 'dummy' messages, using the OTT connection 1050 while it monitors propagation times, errors etc.

FIG. 11 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 11 will be included in this section. In a first step 1110 of the method, the host computer provides user data. In an optional substep 1111 of the first step 1110, the host computer provides the user data by executing a host application. In a second step 1120, the host computer initiates a transmission carrying the user data to the UE. In an optional third step 1130, the base station transmits to the UE the user data which was carried in the transmission that the host computer initiated, in accordance with the teachings of the embodiments described throughout this disclosure. In an optional fourth step 1140, the UE executes a client application associated with the host application executed by the host computer.

FIG. 12 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 12 will be included in this section. In a first step 1210 of the method, the host computer provides user data. In an optional substep (not shown) the host computer provides the user data by executing a host application. In a second step 1220, the host computer initiates a transmission carrying the user data to the UE. The transmission may pass via the base station, in accordance with the teachings of the embodiments described throughout this disclosure. In an optional third step 1230, the UE receives the user data carried in the transmission.

Figures 13, 14:
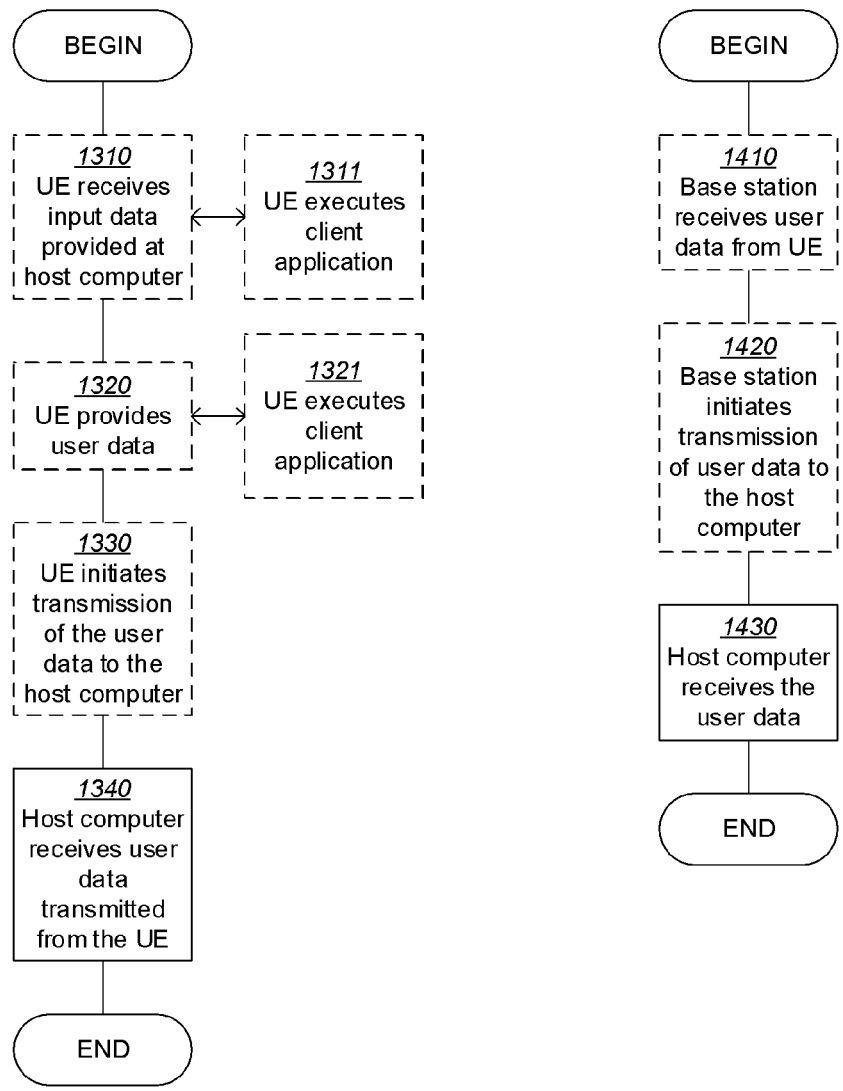

FIG. 13 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 13 will be included in this section. In an optional first step 1310 of the method, the UE receives input data provided by the host computer. Additionally or alternatively, in an optional second step 1320, the UE provides user data. In an optional substep 1321 of the second step 1320, the UE provides the user data by executing a client application. In a further optional substep 1311 of the first step 1310, the UE executes a client application which provides the user data in reaction to the received input data provided by the host computer. In providing the user data, the executed client application may further consider user input received from the user. Regardless of the specific manner in which the user data was provided, the UE initiates, in an optional third substep 1330, transmission of the user data to the host computer. In a fourth step 1340 of the method, the host computer receives the user data transmitted from the UE, in accordance with the teachings of the embodiments described throughout this disclosure.

FIG. 14 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 14 will be included in this section. In an optional first step 1410 of the method, in accordance with the teachings of the embodiments described throughout this disclosure, the base station receives user data from the UE. In an optional second step 1420, the base station initiates transmission of the received user data to the host computer. In a third step 1430, the host computer receives the user data carried in the transmission initiated by the base station.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The invention claimed is:

1. A method in a terminal device for controlling override of a configured grant associated with a first radio resource, comprising:
   receiving from a network device a dynamic grant associated with a second radio resource; and
   determining whether the dynamic grant is to override the configured grant based on:
      whether the first radio resource and the second radio resource at least partially overlap in both time domain and frequency domain; and
      whether a first transmission requirement associated with the configured grant is lower than or equal to a second transmission requirement associated with the dynamic grant.

2. The method of claim 1, wherein said determining whether the dynamic grant is to override the configured grant comprises:
   determining that the dynamic grant is to override the configured grant when the first radio resource and the second radio resource at least partially overlap in the time domain and the frequency domain and the first transmission requirement associated with the configured grant is lower than or equal to the second transmission requirement associated with the dynamic grant.

3. The method of claim 2, wherein the first transmission requirement being lower than or equal to the second transmission requirement comprises one or more of:
   a received power density associated with the configured grant being lower than or equal to that associated with the dynamic grant;
   a Hybrid Automatic Repeat reQuest, HARQ, round trip time associated with the configured grant being longer than or equal to that associated with the dynamic grant; and
   a transmission duration associated with the configured grant being longer than or equal to that associated with the dynamic grant.

4. The method of claim 1, further comprising:
   receiving, from the network device, configuration information associated with the override of the configured grant,
   wherein said determining whether the dynamic grant is to override the configured grant is responsive to the configuration information.

5. The method of claim 4, wherein the configuration information is applicable per configured scheduling configuration, per Medium Access Control, MAC, entity or per cell.

6. The method of claim 4, wherein the configuration information is received via Radio Resource Control, RRC, signaling, a MAC Control Element, CE, or a Physical Downlink Control Channel, PDCCH, order.

7. The method of claim 1, wherein the configured grant and the dynamic grant are each an uplink grant or a downlink assignment.

8. The method of claim 1, wherein said determining whether the dynamic grant is to override the configured grant comprises:
   determining that the dynamic grant is not to override the configured grant when the first radio resource and the second radio resource do not overlap in either the time domain or the frequency domain; and
   determining that the dynamic grant is not to override the configured grant when the first transmission requirement associated with the configured grant is higher than the second transmission requirement associated with the dynamic grant.

9. A terminal device comprising a transceiver, a processor, and a memory, the memory comprising instructions executable by the processor to cause the processor to:
   receive from a network device a dynamic grant associated with a second radio resource; and
   determine whether the dynamic grant is to override a configured grant associated with a first radio resource based on:
      whether the first radio resource and the second radio resource at least partially overlap in time domain and frequency domain; and
      whether a first transmission requirement associated with the configured grant is lower than or equal to a second transmission requirement associated with the dynamic grant.

10. A method in a network device for controlling override of a configured grant associated with a first radio resource, comprising:
    transmitting to a terminal device a dynamic grant associated with a second radio resource; and
    determining whether the dynamic grant is to override the configured grant based on:
       whether the first radio resource and the second radio resource at least partially overlap in time domain and frequency domain; and
       whether a first transmission requirement associated with the configured grant is lower than or equal to a second transmission requirement associated with the dynamic grant.

11. The method of claim 10, wherein said determining whether the dynamic grant is to override the configured grant comprises:
    determining that the dynamic grant is to override the configured grant when the first radio resource and the second radio resource at least partially overlap in the time domain and the frequency domain and the first transmission requirement associated with the configured grant is lower than or equal to the second transmission requirement associated with the dynamic grant.

12. The method of claim 11, wherein the first transmission requirement being lower than or equal to the second transmission requirement comprises one or more of:
    a received power density associated with the configured grant being lower than or equal to that associated with the dynamic grant;
    a Hybrid Automatic Repeat reQuest, HARQ, round trip time associated with the configured grant being longer than or equal to that associated with the dynamic grant; and
    a transmission duration associated with the configured grant being longer than or equal to that associated with the dynamic grant.

13. The method of claim 10, further comprising:
transmitting, to the terminal device, configuration information associated with the override of the configured grant.

14. The method of claim 13, wherein the configuration information is applicable per configured scheduling, per Medium Access Control, MAC, entity or per cell.

15. The method of claim 13, wherein the configuration information is transmitted via Radio Resource Control, RRC, signaling, a MAC Control Element, CE, or a Physical Downlink Control Channel, PDCCH, order.

16. The method of claim 10, wherein the configured grant and the dynamic grant are each an uplink grant or a downlink assignment.

17. The method of claim 10, wherein said determining whether the dynamic grant is to override the configured grant comprises:
determining that the dynamic grant is not to override the configured grant when the first radio resource and the second radio resource do not overlap in either the time domain or the frequency domain; and
determining that the dynamic grant is not to override the configured grant when the first transmission requirement associated with the configured grant is higher than the second transmission requirement associated with the dynamic grant.

18. A network device comprising a transceiver, a processor, and a memory, the memory comprising instructions executable by the processor to cause the processor to:
transmit to a terminal device a dynamic grant associated with a second radio resource; and
determine whether the dynamic grant is to override a configured grant associated with a first radio resource based on:
whether the first radio resource and the second radio resource at least partially overlap in both time domain and frequency domain; and
whether a first transmission requirement associated with the configured grant is lower than or equal to a second transmission requirement associated with the dynamic grant.

\* \* \* \* \*